United States Patent
Schrier et al.

(10) Patent No.: US 9,448,556 B2
(45) Date of Patent: Sep. 20, 2016

(54) APPARATUS AND METHOD FOR ADVANCED ALARMING IN FIELD DEVICE PROTOCOLS

(75) Inventors: Matthew R. Schrier, Holland, PA (US); Raj Bandekar, Lansdale, PA (US)

(73) Assignee: Honeywell International Inc., Morris Plains, NJ (US)

( * ) Notice: Subject to any disclaimer, the term of this patent is extended or adjusted under 35 U.S.C. 154(b) by 700 days.

(21) Appl. No.: 12/910,603

(22) Filed: Oct. 22, 2010

(65) Prior Publication Data

US 2012/0101600 A1    Apr. 26, 2012

(51) Int. Cl.
  G05B 23/02    (2006.01)
  G05B 19/04    (2006.01)
  G05B 19/048   (2006.01)

(52) U.S. Cl.
  CPC .......... *G05B 23/027* (2013.01); *G05B 19/048* (2013.01); *G05B 23/0216* (2013.01); *G05B 2219/25428* (2013.01); *G05B 2219/31121* (2013.01); *G05B 2219/31467* (2013.01)

(58) Field of Classification Search
  CPC ...... G05B 9/02; G05B 23/027; G05B 23/02; G05B 19/058; G05B 9/03; G05B 19/05; G05B 19/042; G05B 19/0423; G05B 19/0426; G05B 15/02; G05B 23/0216; G05B 19/048; G05B 2219/31121; G05B 2219/25428; G05B 2219/31467; G08B 25/14; G08B 25/08
  USPC ............. 700/80, 21, 12, 17; 340/506, 539.1, 340/511; 434/118
  See application file for complete search history.

(56) References Cited

U.S. PATENT DOCUMENTS

| 5,400,246 | A |   | 3/1995  | Wilson et al. |
| 5,581,242 | A |   | 12/1996 | Arita et al. |
| 5,768,119 | A | * | 6/1998  | Havekost et al. ................ 700/4 |
| 5,828,851 | A | * | 10/1998 | Nixon et al. .................. 710/105 |

(Continued)

FOREIGN PATENT DOCUMENTS

| EP | 1813999 A1 | 8/2007 |
| JP | 11085265 A | 3/1999 |

(Continued)

OTHER PUBLICATIONS

International Search Report dated Mar. 2, 2012 in connection with International Patent Application No. PCT/US2011/056521.

(Continued)

*Primary Examiner* — Kenneth M Lo
*Assistant Examiner* — Jason Lin

(57) ABSTRACT

A method includes providing an identification of multiple device-specific parameters to a user, where the device-specific parameters are associated with a field device. The method also includes receiving a selection of at least one of the device-specific parameters from the user. The method further includes, upon receipt of the selection of the at least one device-specific parameter, providing an identification of multiple bits associated with the at least one selected device-specific parameter to the user. The method also includes receiving a selection of at least one of the bits from the user. The method further includes saving the at least one selected device-specific parameter and the at least one selected bit as a custom alarm condition. A selected criticality option or a selected priority option can be saved as part of the custom alarm condition. The custom alarm condition can be loaded into a controller of a process control system.

22 Claims, 7 Drawing Sheets

(56) References Cited

U.S. PATENT DOCUMENTS

| | | | |
|---|---|---|---|
| 6,223,091 B1 | 4/2001 | Powell | |
| 6,421,571 B1* | 7/2002 | Spriggs et al. | 700/17 |
| 6,738,388 B1* | 5/2004 | Stevenson et al. | 370/465 |
| 7,251,534 B2 | 7/2007 | Walls et al. | |
| 2002/0022894 A1* | 2/2002 | Eryurek et al. | 700/80 |
| 2005/0007249 A1* | 1/2005 | Eryurek et al. | 340/511 |
| 2005/0123884 A1* | 6/2005 | Walls et al. | 434/118 |
| 2005/0190054 A1 | 9/2005 | Scott et al. | |
| 2005/0222698 A1 | 10/2005 | Eryurek et al. | |
| 2006/0025872 A1* | 2/2006 | Glanzer et al. | 700/21 |
| 2006/0208872 A1 | 9/2006 | Yu et al. | |
| 2006/0235548 A1* | 10/2006 | Gaudette | 700/83 |
| 2007/0171041 A1* | 7/2007 | Kakimoto et al. | 340/506 |
| 2008/0079559 A1* | 4/2008 | Tambascio | G05B 23/0235 340/506 |
| 2008/0079595 A1* | 4/2008 | Baier | G06Q 10/06 340/679 |
| 2008/0080395 A1* | 4/2008 | Law et al. | 370/254 |
| 2008/0178202 A1* | 7/2008 | Blackman | G06F 13/385 719/327 |
| 2008/0255681 A1* | 10/2008 | Scott et al. | 700/12 |
| 2008/0294771 A1* | 11/2008 | Hermes et al. | 709/224 |
| 2009/0064019 A1* | 3/2009 | Cahill et al. | 715/765 |
| 2009/0212936 A1 | 8/2009 | Granatelli et al. | |
| 2009/0224906 A1* | 9/2009 | Balgard et al. | 340/539.1 |
| 2010/0004759 A1* | 1/2010 | Scott et al. | 700/12 |

FOREIGN PATENT DOCUMENTS

| | | |
|---|---|---|
| JP | 2000200101 A | 7/2000 |
| JP | 2004086338 A | 3/2004 |
| WO | WO2009/026699 A1 | 3/2009 |

OTHER PUBLICATIONS

Written Opinion of the International Searching Authority dated Mar. 2, 2012 in connection with International Patent Application No. PCT/US2011/056521.

International Search Report dated Apr. 20, 2009 in connection with International Patent Application No. PCT/US2009/033498.

Written Opinion of the International Searching Authority dated Apr. 20, 2009 in connection with International Patent Application No. PCT/US2009/033498.

Tord Bergquist, et al., "Alarm Reduction in Industrial Process Control", Proceeding of the EFTA 2003, Portugal, 2003, 8 pages.

Extended European Search Report dated Apr. 8, 2014 in connection with European Application No. 11834920.8, 10 pages.

* cited by examiner

APPARATUS AND METHOD FOR ADVANCED ALARMING IN FIELD DEVICE PROTOCOLS

TECHNICAL FIELD

This disclosure relates generally to control systems. More specifically, this disclosure relates to an apparatus and method for advanced alarming in field device protocols.

BACKGROUND

Processing facilities are often managed using process control systems. Example processing facilities include manufacturing plants, chemical plants, crude oil refineries, and ore processing plants. Among other operations, process control systems typically manage the use of motors, valves, and other industrial equipment in the processing facilities.

In conventional process control systems, controllers are often used to control the operation of the industrial equipment in the processing facilities. The controllers could, for example, monitor the operation of the industrial equipment, provide control signals to the industrial equipment, and generate alarms when malfunctions are detected. However, certain standardized field device protocols utilized in process control systems can inhibit alarm options.

SUMMARY

This disclosure provides an apparatus and method for advanced alarming in field device protocols.

In a first embodiment, a method includes providing an identification of multiple device-specific parameters to a user, where the device-specific parameters are associated with a field device. The method also includes receiving a selection of at least one of the device-specific parameters from the user. The method further includes, upon receipt of the selection of the at least one device-specific parameter, providing an identification of multiple bits associated with the at least one selected device-specific parameter to the user. The method also includes receiving a selection of at least one of the bits from the user. In addition, the method includes saving the at least one selected device-specific parameter and the at least one selected bit as a custom alarm condition.

In a second embodiment, an apparatus includes a processing unit configured to provide an identification of multiple device-specific parameters to a user, where the device-specific parameters are associated with a field device. The processing unit is also configured to receive a selection of at least one of the device-specific parameters from the user. The processing unit is further configured to, upon receipt of the selection of the at least one device-specific parameter, provide an identification of multiple bits associated with the at least one selected device-specific parameter to the user. In addition, the processing unit is configured to receive a selection of at least one of the bits from the user. The apparatus also includes a memory configured to store the at least one selected device-specific parameter and the at least one selected bit as a custom alarm condition.

In a third embodiment, a computer readable medium embodies a computer program. The computer program includes computer readable program code for providing an identification of multiple device-specific parameters to a user, where the device-specific parameters are associated with a field device. The computer program also includes computer readable program code for receiving a selection of at least one of the device-specific parameters from the user. The computer program further includes computer readable program code for, upon receipt of the selection of the at least one device-specific parameter, providing an identification of multiple bits associated with the at least one selected device-specific parameter to the user. The computer program also includes computer readable program code for receiving a selection of at least one of the bits from the user. In addition, the computer program includes computer readable program code for saving the at least one selected device-specific parameter and the at least one selected bit as a custom alarm condition.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
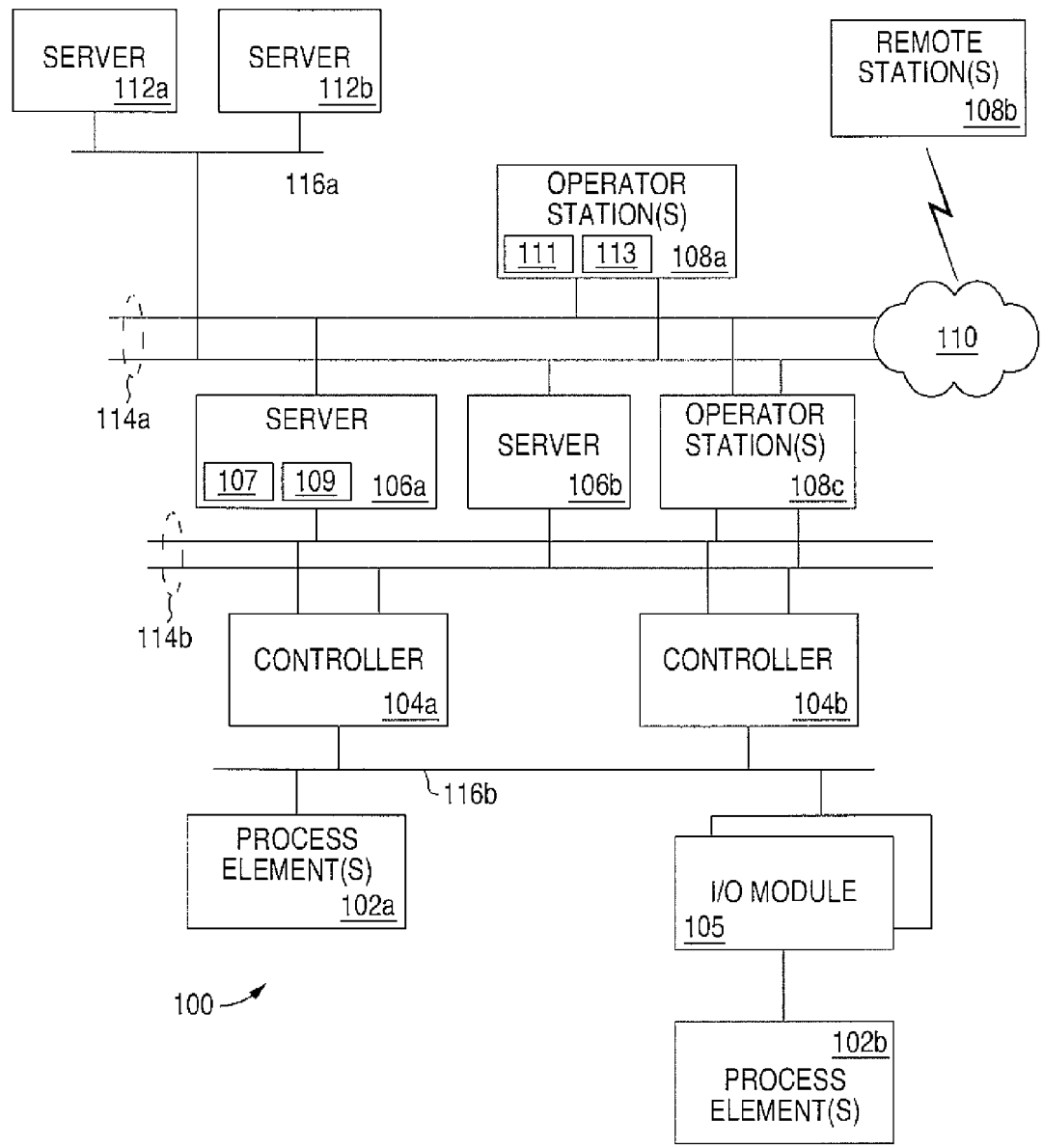
FIG. 1 illustrates an example process control system in accordance with this disclosure.

FIG. 1 illustrates an example process control system 100 in accordance with this disclosure. The process control system 100 shown in FIG. 1 is for illustration only. Other embodiments of a process control system may be used without departing from the scope of this disclosure.

As shown in FIG. 1, the process control system 100 includes one or more process elements 102a-102b. The process elements 102a-102b represent components in a process or production system that may perform any of a wide variety of functions. For example, the process elements 102a-102b could represent gauges, valves, transmitters, sensors, motors, catalytic crackers, valves, or other industrial equipment in a production or processing environment. The process elements 102a-102b could represent any other or additional components in any suitable process or production system. The process elements 102a-102b may be referred to as "field devices." Each of the process elements 102a-102b includes any suitable structure for performing one or more functions in a process or production system.

Although two process elements 102a-102b are shown in FIG. 1, any number of process elements could be used in the process control system 100.

Two controllers 104a-104b are coupled to the process elements 102a-102b. The controllers 104a-104b control the operation of the process elements 102a-102b. For example, the controllers 104a-104b could be capable of generating control signals for some of the process elements 102a-102b based on data received from others of the process elements 102a-102b. Each of the controllers 104a-104b includes any suitable structure for controlling one or more process elements. Example controllers 104a-104b could include, but are not limited to, C300 controllers and SERIES C Fieldbus Interface Modules (FIMs) from HONEYWELL INTERNATIONAL INC.

In some embodiments, one or more input/output (I/O) modules 105 could operate between the controllers 104a-104b and one or more of the process elements 102a-102b (one or more process elements 102b in this case). Each I/O module 105 facilitates communication between the controllers 104a-104b and the process element(s) 102b. For example, an I/O module 105 could represent a data acquisition device that receives data from a controller and provides the data to a process element. The I/O module 105 could also receive data from the process element and provide the data to the controller. Each I/O module 105 includes any suitable structure for facilitating communication between controllers and process elements. Example I/O modules could include, but are not limited to, SERIES C IOM from HONEYWELL INTERNATIONAL INC. As shown in FIG. 1, the I/O modules 105 could operate in redundant groups.

Two servers 106a-106b are coupled to the controllers 104a-104b. The servers 106a-106b perform various functions to support the operation and control of the controllers 104a-104b and the process elements 102a-102b. For example, the servers 106a-106b could log information collected or generated by the controllers 104a-104b, such as status information related to the operation of the process elements 102a-102b. The servers 106a-106b could also execute applications that control the operation of the controllers 104a-104b, thereby controlling the operation of the process elements 102a-102b. In addition, the servers 106a-106b could provide secure access to the controllers 104a-104b. Each of the servers 106a-106b includes any suitable structure for providing access to or control of the controllers 104a-104b. Each of the servers 106a-106b could, for example, include one or more processors 107 and one or more memories 109 storing data and instructions used by the processor(s) 107 (such as software executed by the servers 106a-106b). In particular embodiments, the servers 106a-106b could represent personal computers (such as desktop computers) executing a MICROSOFT WINDOWS operating system.

One or more operator stations 108a-108b are coupled to the servers 106a-106b, and one or more operator stations 108c are coupled to the controllers 104a-104b. The operator stations 108a-108c represent computing or communication devices providing user access to servers 106a-106b, controllers 104a-104b, process elements 102a-102b, or other devices. As particular examples, the operator stations 108a-108c could allow users to review the operational history of the process elements 102a-102b using information collected by the controllers 104a-104b and/or the servers 106a-106b. The operator stations 108a-108c could also allow the users to adjust the operation of the process elements 102a-102b, controllers 104a-104b, or servers 106a-106b. Each of the operator stations 108a-108c includes any suitable structure for supporting user access and control of the system 100. Each of the operator stations 108a-108c could, for example, include one or more processors 111 and one or more memories 113 storing data and instructions used by the processor(s) 111 (such as software executed by the operator stations 108a-108c). In particular embodiments, the operator stations 108a-108c could represent personal computers executing a MICROSOFT WINDOWS operating system.

In particular embodiments, at least one of the operator stations 108b is remote and communicates through a network 110. The network 110 facilitates communication between various components in the system 100. For example, the network 110 may communicate Internet Protocol (IP) packets, frame relay frames, Asynchronous Transfer Mode (ATM) cells, or other suitable information between network addresses. The network 110 may include one or more local area networks (LANs), metropolitan area networks (MANs), wide area networks (WANs), a global network such as the Internet, or any other communication system or systems at one or more locations.

In this example, the system 100 includes two additional servers 112a-112b. The servers 112a-112b execute various applications to control the overall operation of the system 100. For example, the system 100 could be used in a processing or production plant or other facility, and the servers 112a-112b could execute applications used to control the plant or other facility. As particular examples, the servers 112a-112b could execute applications such as enterprise resource planning (ERP), manufacturing execution system (MES), or any other or additional plant or process control applications. Each of the servers 112a-112b includes any suitable structure for controlling the overall operation of the system 100.

As shown in FIG. 1, the system 100 may include various redundant networks 114a-114b and single networks 116a-116b that support communication between components in the system 100. Each of these networks 114a-114b, 116a-116b represents any suitable network or combination of networks facilitating communication between components in the system 100. As particular examples, each of the networks 114a-114b could represent a pair of Ethernet networks or a FAULT TOLERANT ETHERNET network from HONEYWELL INTERNATIONAL INC., and each of the networks 116a-116b could represent an Ethernet network.

In one aspect of operation, the controllers 104a-104b can execute logic, such as in the form of software or firmware instructions. Also, the controllers 104a-104b may operate as redundant controllers in the process control system 100. For example, the controller 104a could function as a primary controller, which means the controller 104a functions as the primary or main controller of the process elements 102a-102b. The controller 104b could function as a backup or secondary controller, which means the controller 104b could be synchronized with the controller 104a and take over control of the process elements 102a-102b when necessary (such as after a failure of the controller 104a).

Various communications in the system 100 (such as over the network 116b) could utilize a certain field device protocol, such as the FOUNDATION Fieldbus (FF) protocol. The FOUNDATION Fieldbus protocol is a standardized protocol for operation of field devices and inter-communications between field devices and host systems in the process control industry. Many data values in FOUNDATION Fieldbus devices are parameterized.

The FOUNDATION Fieldbus protocol defines a standard set of alarms designed to provide a minimum set of diagnostic notifications to a host system. However, over time, these standard "block alarms" as they are referred to in the industry have proved to be inadequate. Many device vendors have created a number of specialized parameters to hold diagnostic indicators. However, legacy versions of the FOUNDATION Fieldbus protocol do not define a standard way to extract parameterized diagnostic information and present such information to plant operators in a central display (such as in an alarm display). Therefore, this information has gone largely unused.

Furthermore, although protocols (including FOUNDATION Fieldbus) are adapting to designate new alarms parameters, older devices complying with previous versions of a particular protocol are "out of luck" for such enhanced alarm options. Additionally, such adapted protocols still do not tap into the ever-increasing diagnostic parameters provided by device manufacturers.

Given these problems, certain embodiments of the disclosure step in to fill this gap. This disclosure provides a mechanism for tapping into diagnostic information of field devices (such as FOUNDATION Fieldbus devices) and pushing the information from the field devices to operators. In particular embodiments, a user is able to (a) create custom diagnostic alarms that reflect one of more individual indicators in a field device, (b) select which diagnostic indicators to monitor for each custom alarm, and (c) select other attributes of the alarms (such as priority and criticality) according to his or her preference.

As described below, this custom alarm information may be loaded into a system that continuously monitors parameters of field devices (as may be prescribed by custom alarms) and generates system alarms when certain conditions occur. These alarms may be transmitted by controllers 104a-104b and managed by an existing alarm infrastructure, allowing an operator to avoid learning new tools or procedures. One example of an alarm infrastructure is the EXPERION suite of software from HONEYWELL INTERNATIONAL INC.

Although FIG. 1 illustrates one example of a process control system 100, various changes may be made to FIG. 1. For example, the functional division in FIG. 1 is for illustration only. Various components in FIG. 1 could be omitted, combined, or further subdivided and additional components could be added according to particular needs. Also, FIG. 1 illustrates one example operational environment in which the advanced alarming functionality described below can be used. This functionality could be used in any other suitable system.

FIGS. 2 through 5 illustrate example user interfaces in accordance with this disclosure. The user interfaces shown in FIGS. 2 through 5 are for illustration only. Other user interfaces may be used without departing from the scope of this disclosure.

In one aspect of operation, a user can select certain device parameters (such as specific bits) and associate those parameters with alarms as "conditions." The conditions may then be loaded into, for example, the controllers 104a-104b, where the controllers scan device parameters, compare them with the conditions, and generate alarms as necessary.

Figure 2:
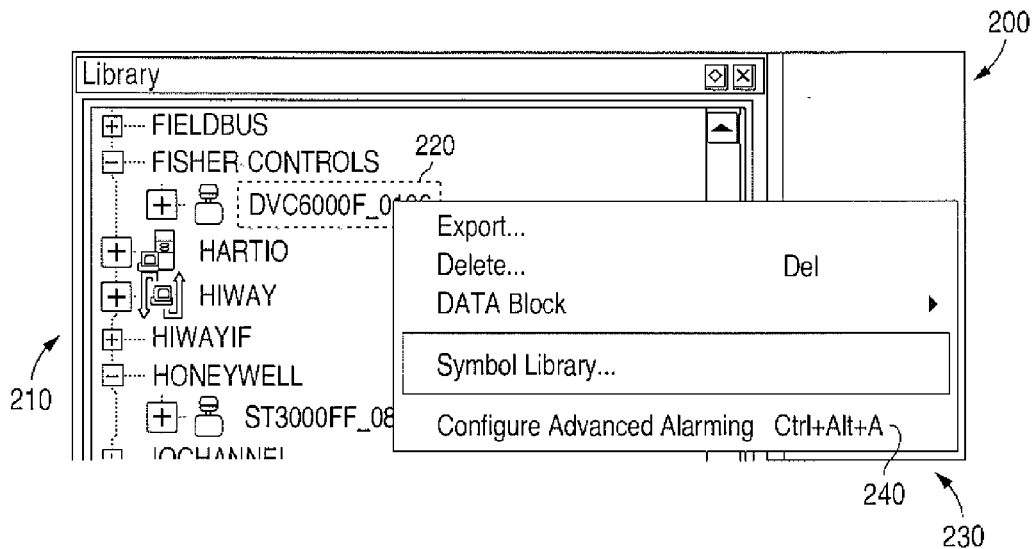
FIG. 2 illustrates an example device selection user interface in accordance with this disclosure.

FIG. 2 illustrates an example device selection user interface 200 in accordance with this disclosure. To access the interface 200, a user may utilize an operator station 108a-108c of FIG. 1 or any another device capable of configuring alarms. The interface 200 may be served by one of the servers, an operator station, or other device(s).

The interface 200 here includes a tree structure 210 identifying various devices in a control system. A particular device 220 can be highlighted in the tree structure 210, and a pop-up menu 230 can be presented (such as in response to a right click of the highlighted device 220). The pop-up menu 230 includes a "Configure Advanced Alarm" option 240. Upon clicking this option 240, an interface 300 as shown in FIG. 3 may be displayed.

Figure 3:
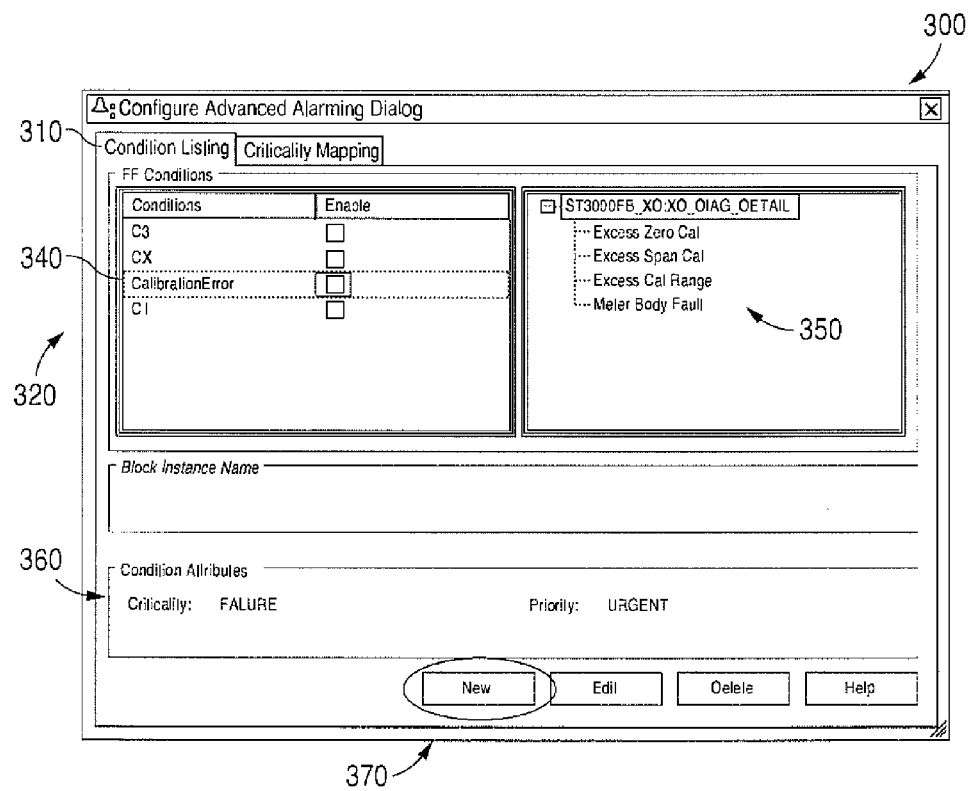
FIG. 3 illustrates an example advanced alarming configuration user interface in accordance with this disclosure.

FIG. 3 illustrates an example advanced alarming configuration user interface 300 in accordance with this disclosure. In the interface 300, a condition listing tab 310 can be selected. On the left side of the interface 300 is a conditions box 320 with four conditions associated with the selected device from FIG. 2. These conditions may have been previously entered (such as by a user) or may be associated with a modifiable template for the particular device. Next to each condition is a check box under an "Enable" column. Checking each box enables the respective condition. Thus, as can be seen in FIG. 3, although four conditions exist, none of them is currently enabled. Further details of enabling a condition are described below.

A condition 340 named "Calibration Error" is currently selected (highlighted) in the conditions box 320. The selection of this condition 340 shows its related parameters in a box 350 on the right of the conditions box 320. The indicated parameters in the box 350 are those that are currently associated with the selected condition as described in greater detail below. These parameters can be modified to adjust the selected condition 340.

Towards the bottom of the interface 300 is a Condition Attributes box 360, which displays certain items for the selected condition 340. These attributes include a selected criticality ("FAILURE") and a selected priority ("URGENT"). Further details of the condition attributes 360 (including the modification thereof) are described below.

In addition, the interface 300 includes several buttons 370, including a "New" button, an "Edit" button, a "Delete" button, and a "Help" button. The first three buttons allow modification of the conditions for the selected device 220. The "New" button allows creation of a new condition, while the edit and delete buttons allow editing and deletion of the condition 340 that is currently selected. The "help" button invokes a help dialog that assists a user in interacting with the interface 300. Upon selecting the "New" or "Edit" button, an interface 400 as shown in FIGS. 4A-4C may be displayed.

Figure 4A:
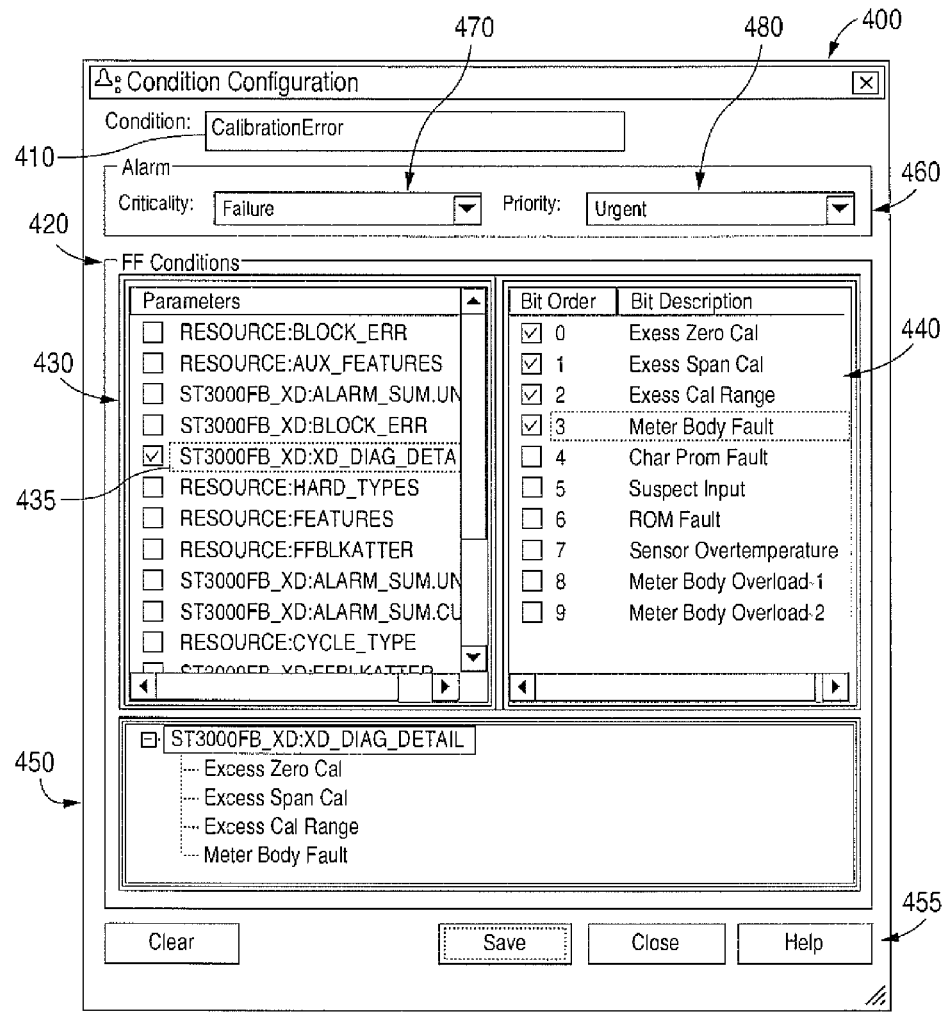
FIGS. 4A-4C illustrate an example condition configuration interface in accordance with this disclosure.
Figure 4B:
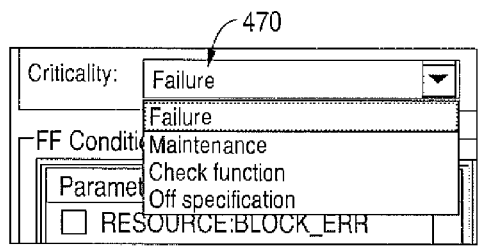
Figure 4C:
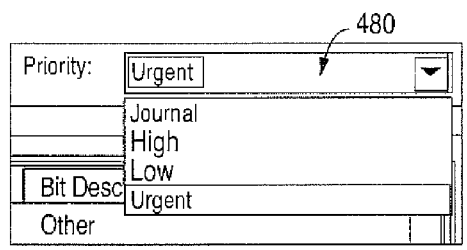

FIGS. 4A-4C illustrate an example condition configuration interface 400 in accordance with this disclosure. At the top of the interface 400 is a condition name box 410. If the condition is new, the condition name box 410 may be empty and filled in by the user. Additionally, a user may modify the condition name box 410 according to his or her preferences.

In the middle of the interface 400 is a conditions box 420, which includes a parameters box 430 on the left and a bitmask box 440 on the right. The conditions box 420 provides customized alarm condition options for selection by the user. In this particular embodiment, the user selects at least one parameter from the parameters box 430 and at least one bit from the bitmask box 440. In certain embodiments, more than one of each may be selected.

As shown here, a particular parameter 435 in the parameters box 430 is currently selected. Accordingly, the selectable bits in the bitmask box 440 associated with the parameter 435 are shown on the right. The first four bits are shown as being selected. In some embodiments, the bit descriptions in the bitmask box 440 may come from the manufacturer of a field device and may be described in a user manual for the field device.

In particular embodiments, the "bits" in the bitmask box 440 correspond to states of a particular device parameter of a particular field device. As a simple example, a bit may simply be a "1" or a "0" for a particular parameter of a field device that may change as the device operates. These bit states can be monitored to determine changes to the device.

Although the monitored item of a field device has been described as a "bit," in other embodiments the monitored item may be a bitstring. In these embodiments, bitstrings from the following sources may be used: simple parameters, record elements, and array elements. Additionally, in particular embodiments, all read-only bitstring parameters in a field device's resource and transducer blocks can be monitored, including both alarm-related and non-alarm-related parameters. Although two example states of "1" or "0" are described above, items with more than two states could be monitored.

A box 450 at the bottom of the interface 400 shows the particular parameter(s) selected in the parameters box 430 along with the particular bit(s) selected in the bitmask box 440 for the selected parameter(s). As can be seen, only a single parameter 435 has been selected, so only a single node is shown in the box 450. For the single node, four bits are shown as being selected. These four bits are identified according to their bit description.

The interface 400 also includes various buttons 455, including "clear," "save," "close," and "help" buttons. The "clear" button clears the selections in the interface 400, and the "save" button saves the selections. The "close" button closes the interface 400, and the "help" button invokes a help box to assist a user with selections.

The interface 400 further includes an alarm box 460. The alarm box 460 includes a criticality selection box 470 and a priority selection box 480, which are shown in FIGS. 4B and 4C, respectively.

FIG. 4B shows the criticality selection box 470 for a condition, and FIG. 4C shows the priority selection box 480 for the condition. The criticality selection box 470 in FIG. 4B includes four choices: Failure, Maintenance, Check Function, and Off Specification. The "Failure" selection may generally indicate that an output signal is invalid due to malfunction in a field device or peripheral. The "Maintenance" selection may generally indicate that, although the output signal is valid, the wear reserve is nearly exhausted or a function will soon be restricted due to operational conditions (such as a build-up of deposits). The "Check Function" selection may generally indicate than an output signal is temporarily invalid (such as frozen) due to ongoing work on the field device. The "Off-Specification" designation may generally designate that the field device is operating outside its specified range (such as a measuring or temperature range) or that internal diagnoses indicate deviations from measured or set values due to internal problems in the device or process characteristics (such as bubble formation in flow metering). Although four specific choices are shown here, other embodiments may include any number of choices, and those choices may or may not include the ones shown here.

The priority selection box 480 in FIG. 4C includes four choices: Journal, High, Low, and Urgent. Each of these selections can generally indicate a priority associated with an alarm. "Journal" may indicate that an event is simply logged, while "High," "Low," and "Urgent" may be levels associated with an alarm generated by the system. Appropriate responses and alarm routings may be dictated by the priority of the alarm. Although four specific choices are shown here, other embodiments may include any number of choices, and those choices may or may not include the ones shown here.

Figure 5:
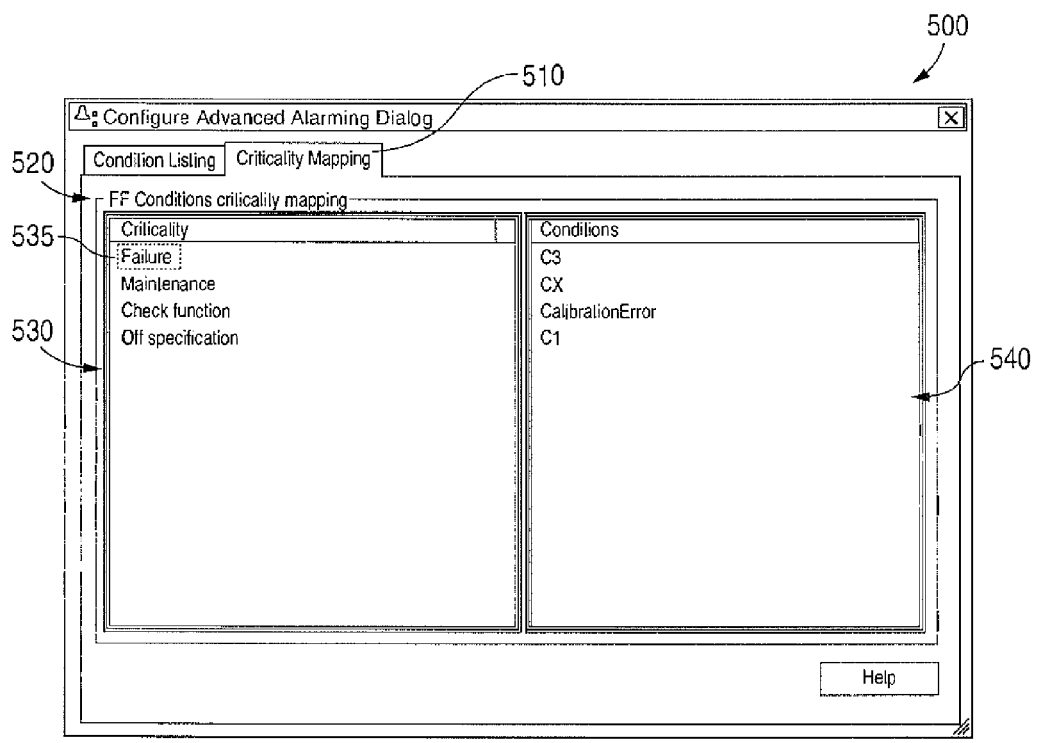
FIG. 5 illustrates an example criticality mapping interface in accordance with this disclosure.

FIG. 5 illustrates an example criticality mapping interface 500 in accordance with this disclosure. The interface 500 may be accessed by clicking on a "Criticality Mapping" tab 510, which is also shown in FIG. 3. In the middle of the interface 500 is a condition criticality mapping box 520, which includes a criticality box 530 and a conditions box 540. Upon highlighting a particular criticality component 535 in the criticality box 530, the conditions box 540 on the right shows which conditions have been marked with the selected criticality component 535.

Although FIGS. 2 through 5 illustrate examples of user interfaces, various changes may be made to FIGS. 2 through 5. For example, the content and arrangement of the user interfaces are for illustration only. Each user interface could have any suitable content, and each user interface could have any suitable arrangement of information. In addition, specific input/output mechanisms (such as text boxes, pop-up menus, drop-down menus, and buttons) are shown in the figures. Any other suitable input/output mechanisms could be used.

Figure 6:
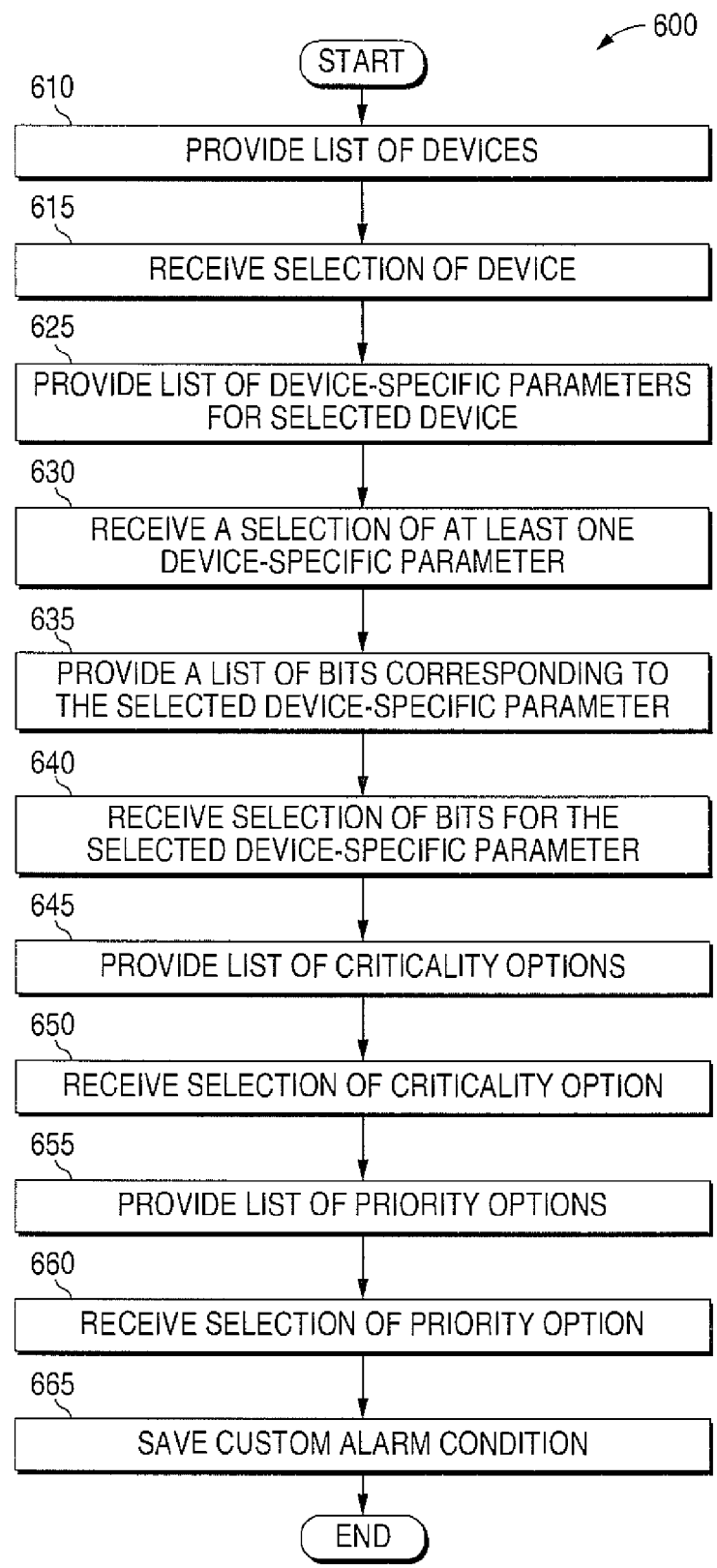
FIG. 6 illustrates an example method for adding custom alarm conditions in accordance with this disclosure.

FIG. 6 illustrates an example method 600 for adding custom alarm conditions in accordance with this disclosure. At step 610, a user is provided with a list of devices. This may occur in a variety of different ways, such as by using the tree structure 210 in the user interface 200 of FIG. 2. At step 615, the user's selection of a device is received. This could include the user right-clicking on a device 220 in the tree structure 210 and selecting the "Configure Advanced Alarm" option 240 in the pop-up menu 230 of FIG. 2. The device may be selected in any other suitable manner.

At step 625, the user is provided with a list of device-specific parameters for the selected device. This could include displaying items in the parameters box 430 of FIG. 4A. At step 630, the user's selection of at least one parameter is received. This could include receiving the selection of one or more parameters 435 in the parameters box 430 by detecting the checking of any checkboxes. One or more parameters in the parameters box 430 may be selected.

At step 635, the user is provided with a list of bits corresponding to the selected device-specific parameter. This could include the items appearing in the bitmask box 440 of FIG. 4A. At step 640, the user's selection of one or more bits for the selected device-specific parameter is received. This could include receiving the selection of one or more bits in the bitmask box 440 by detecting the checking of any checkboxes. One or more bits in the bitmask box 440 may be selected.

At step 645, the user is provided with a list of criticality options, such as by using the criticality selection box 470 shown in FIG. 4B. At step 650, the user's criticality option selection is received. At step 655, the user is provided with a list of priority options, such as by using the priority selection box 480 shown in FIG. 4C. At step 660, the user's priority option selection is received.

At step 665, a custom alarm condition is saved, such as under the name provided in the condition name box 410 of FIG. 4A. In particular embodiments, errors may be detected and identified to the user, such as when expected inputs have not been received at certain stages. As a particular example, if changes are made but not saved, a user may receive an indicator showing that changes have not been saved. In other embodiments, all changes may be automatically saved upon entry by a user.

Figure 7:
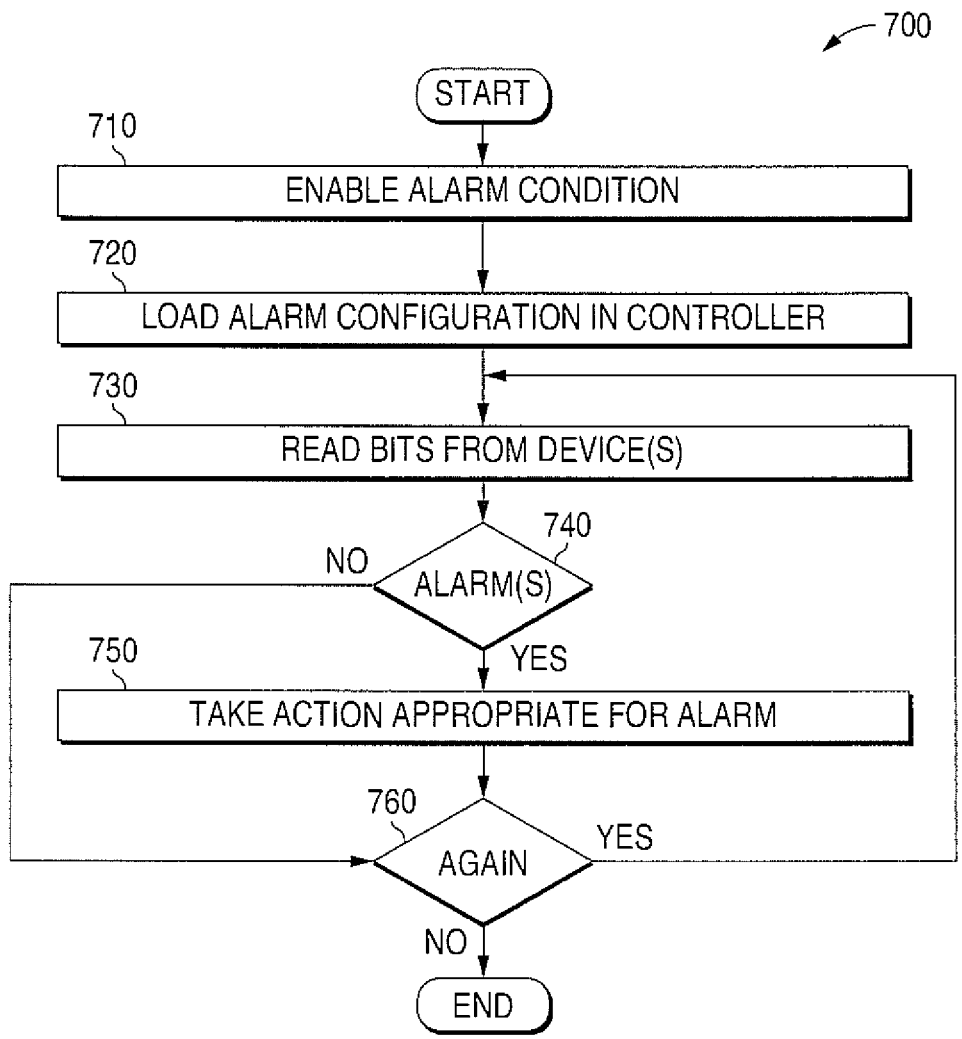
FIG. 7 illustrates an example method for implementing an alarm condition in accordance with this disclosure.

FIG. 7 illustrates an example method 700 for implementing an alarm condition in accordance with this disclosure. At step 710, an alarm condition is enabled. As an example, a user may simply click the "enable" checkbox is item shown in the conditions box 320 of FIG. 3. At step 720, the alarm condition is loaded, such as into a controller 104a-104b. In particular embodiments, this may include loading the alarm condition at the same time a device configuration is loaded into the controller 104a-104b. In other embodiments, the alarm condition may be loaded at run-time, catching the next alarm cycle (discussed below). In still other embodiments, an alarm condition may be disabled and removed from a controller 104a-104b at run-time.

Figure 8:
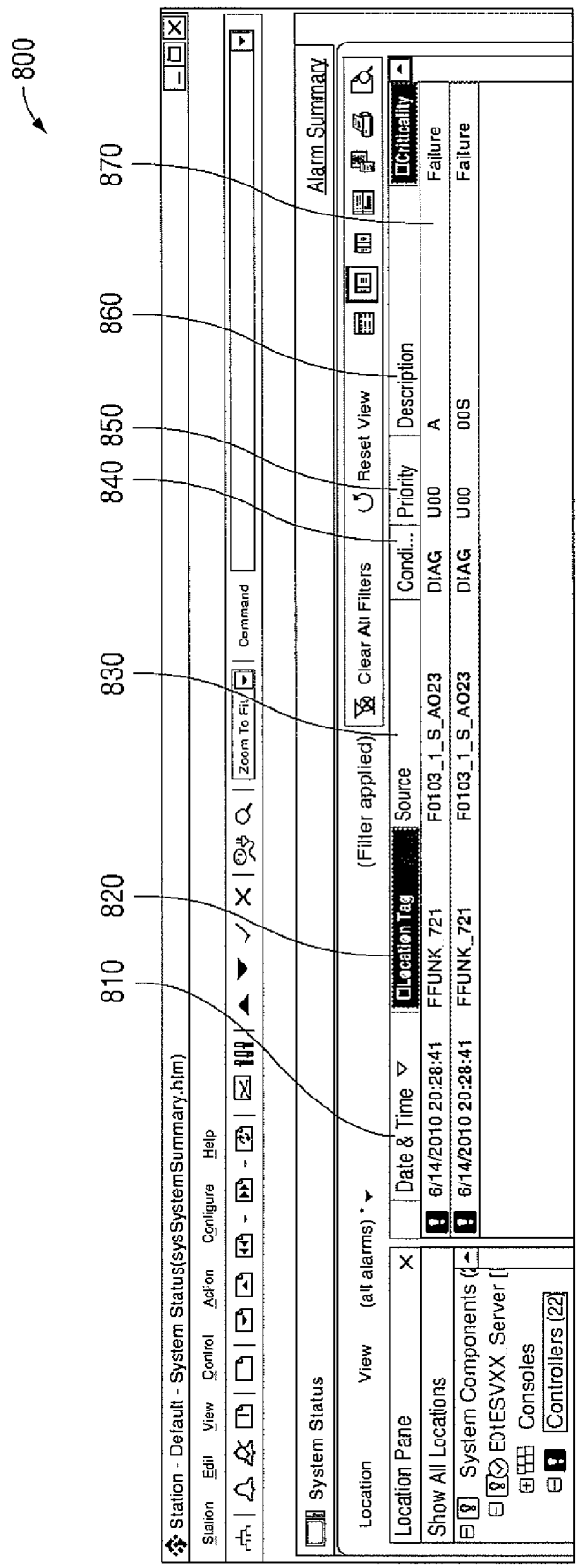
FIG. 8 illustrates an example system status interface in accordance with this disclosure.

After a particular configuration has been loaded, a particular alarm cycle begins for that condition. Alternatively, the alarm cycle may have been processing for other alarm conditions when the current alarm condition enters the alarm condition cycle. At step 730, the device implementing the alarm condition (such as the controller or other device) may read bits from the device(s) that it is designated to read. At decision step 740, if an alarm is detected, an appropriate action may be taken at step 750. As an example, the user may be alerted as shown in FIG. 8, which is described below. An alarm may occur if a selected bit changes state as defined in FIG. 4A. If an alarm does not occur, the method 700 skips step 750.

At decisional step 760, the method 700 determines whether the prior steps 730-750 are repeated. The time for a complete cycle 730-760 can be dependent on the number of bits scanned. In some embodiments, a cycle may take approximately four minutes. In other embodiments, it may take less than or more than four minutes.

Although FIGS. 6 and 7 illustrate examples of methods for adding custom alarm conditions and implementing an alarm condition, various changes may be made to FIGS. 6 and 7. For example, while shown as a series of steps, various steps in each figure could overlap, occur in parallel, occur in a different order, or occur multiple times.

FIG. 8 illustrates an example system status interface 800 in accordance with this disclosure. In this example, the system status interface 800 includes a date and time 810, a location tag 820, a source 830, a condition 840, a priority 850, a description 860, and a criticality 870. The date and time 810 identifies the date and time of an alarm. The location tag 820 and source 830 identify the device that generates an alarm and the device's location. The condition 840, priority 850, description 860, and criticality 870 are alarm-based information and can be configured as described above.

Although FIG. 8 illustrates one example of a system status interface 800, various changes may be made to FIG. 8. For example, custom alarms can be displayed in any other suitable interface.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:

providing an identification of multiple device-specific parameters to a user, the device-specific parameters associated with a legacy field device that is configured to support a set of field device protocol standard alarms without user-selected device-specific parameters in accordance with a legacy version of a field device protocol but is incapable of supporting new alarm parameters associated with newer versions of the field device protocol, the set of field device protocol standard alarms providing a set of diagnostic notifications;

receiving a selection of at least one of the device-specific parameters from the user, the at least one selected device-specific parameter comprising at least one diagnostic indicator of the legacy field device;

upon receipt of the selection of the at least one device-specific parameter, providing an identification of multiple bits associated with the at least one selected device-specific parameter to the user, the multiple bits corresponding to multiple states of the legacy field device;

receiving a selection of at least one of the bits from the user;

saving the at least one selected device-specific parameter and the at least one selected bit as a custom alarm condition, the custom alarm condition defining a custom diagnostic alarm that is different than the diagnostic notifications in the protocol standard alarms; and generating the custom diagnostic alarm when the custom alarm condition occurs.

2. The method of claim 1, further comprising:
providing an identification of multiple criticality options for the custom alarm condition to the user; and
receiving a selection of one of the criticality options from the user;
wherein the selected criticality option is saved as part of the custom alarm condition.

3. The method of claim 1, further comprising:
providing an identification of multiple priority options for the custom alarm condition; and
receiving a selection of one of the priority options from the user;
wherein the selected priority option is saved as part of the custom alarm condition.

4. The method of claim 1, further comprising:
receiving from the user an indication of whether to enable or disable the custom alarm condition.

5. The method of claim 4, further comprising:
after the user has enabled the custom alarm condition, initiating a loading of the custom alarm condition into a controller.

6. The method of claim 5, wherein the custom alarm condition is loaded into the controller in conjunction with a loading of a configuration of the legacy field device into the controller.

7. The method of claim 5, wherein the custom alarm condition is loaded into the controller during a run-time of the controller.

8. The method of claim 1, wherein the legacy field device is configured to support at least one version of a FOUNDATION Fieldbus protocol.

9. The method of claim 1, further comprising:
monitoring a bitstring to determine changes to the legacy field device, wherein the bitstring includes at least one of: simple parameters, record elements, or array elements,
wherein the at least one selected device-specific parameter includes a diagnostic indicator created by a vendor or a device manufacturer of the legacy field device.

10. The method of claim 1, wherein the selection of the at least one device-specific parameter comprises a selection of a plurality of device-specific parameters, and
wherein the selection of the at least one of the bits comprises a selection of a first bit corresponding to a state of the legacy field device and a second bit corresponding to another state of the legacy field device.

11. An apparatus comprising:
a processing unit configured to:
provide an identification of multiple device-specific parameters to a user, the device-specific parameters associated with a legacy field device that is configured to support a set of field device protocol standard alarms without user-selected device-specific parameters in accordance with a legacy version of a field device protocol but is incapable of supporting new alarm parameters associated with newer versions of the field device protocol, the set of field device protocol standard alarms providing a set of diagnostic notifications;
receive a selection of at least one of the device-specific parameters from the user, the at least one selected device-specific parameter comprising at least one diagnostic indicator of the legacy field device;
upon receipt of the selection of the at least one device-specific parameter, provide an identification of multiple bits associated with the at least one selected device-specific parameter to the user, the multiple bits corresponding to multiple states of the legacy field device; and
receive a selection of at least one of the bits from the user; and
a memory configured to store the at least one selected device-specific parameter and the at least one selected bit as a custom alarm condition, the custom alarm condition defining a custom diagnostic alarm that is different than the diagnostic notifications in the protocol standard alarms,
wherein the processing unit is configured to generate the custom diagnostic alarm when the custom alarm condition occurs.

12. The apparatus of claim 11, wherein:
the processing unit is further configured to:
provide an identification of multiple criticality options for the custom alarm condition to the user; and
receive a selection of one of the criticality options from the user; and
the memory is configured to store the selected criticality option as part of the custom alarm condition.

13. The apparatus of claim 11, wherein:
the processing unit is further configured to:
provide an identification of multiple priority options for the custom alarm condition; and
receive a selection of one of the priority options from the user; and
the memory is configured to store the selected priority option as part of the custom alarm condition.

14. The apparatus of claim 11, wherein the processing unit is further configured to receive from the user an indication of whether to enable or disable the custom alarm condition.

15. The apparatus of claim 14, wherein the processing unit is further configured, after the user has enabled the custom alarm condition, to initiate a loading of the custom alarm condition into a controller.

16. The apparatus of claim 11, wherein the legacy field device is configured to support at least one version of a FOUNDATION Fieldbus field device.

17. A non-transitory computer readable storage medium embodying a computer program, the computer program comprising computer readable program code for:
providing an identification of multiple device-specific parameters to a user, the device-specific parameters associated with a legacy field device that is configured to support a set of field device protocol standard alarms without user-selected device-specific parameters in accordance with a legacy version of a field device protocol but is incapable of supporting new alarm parameters associated with newer versions of the field device protocol, the set of field device protocol standard alarms providing a set of diagnostic notifications;
receiving a selection of at least one of the device-specific parameters from the user, the at least one selected device-specific parameter comprising at least one diagnostic indicator of the legacy field device;
upon receipt of the selection of the at least one device-specific parameter, providing an identification of multiple bits associated with the at least one selected device-specific parameter to the user, the multiple bits corresponding to multiple states of the legacy field device;
receiving a selection of at least one of the bits from the user;

saving the at least one selected device-specific parameter and the at least one selected bit as a custom alarm condition, the custom alarm condition defining a custom diagnostic alarm that is different than the diagnostic notifications in the protocol standard alarms; and generating the custom diagnostic alarm when the custom alarm condition occurs.

18. The non-transitory computer readable storage medium of claim 17, further comprising computer readable program code for:

providing an identification of multiple criticality options for the custom alarm condition to the user;

receiving a selection of one of the criticality options from the user; and saving the selected criticality option as part of the custom alarm condition.

19. The non-transitory computer readable storage medium of claim 17, further comprising computer readable program code for:

providing an identification of multiple priority options for the custom alarm condition;

receiving a selection of one of the priority options from the user; and saving the selected priority option as part of the custom alarm condition.

20. The non-transitory computer readable storage medium of claim 17, further comprising computer readable program code for:

receiving from the user an indication of whether to enable or disable the custom alarm condition.

21. The non-transitory computer readable storage medium of claim 20, further comprising computer readable program code for:

after the user has enabled the custom alarm condition, initiating a loading of the custom alarm condition into a controller.

22. The non-transitory computer readable storage medium of claim 17, wherein the legacy field device is configured to support a legacy version of a FOUNDATION Fieldbus protocol that does not define a standard way to extract and display parameterized diagnostic information including a diagnostic indicator of the legacy field device created by a vendor or a device manufacturer of the legacy field device.

* * * * *